Aug. 4, 1959     H. G. PLUST     2,898,278
PROCESS FOR THE PRODUCTION OF HIGH-PURITY GALLIUM
Filed Nov. 21, 1957
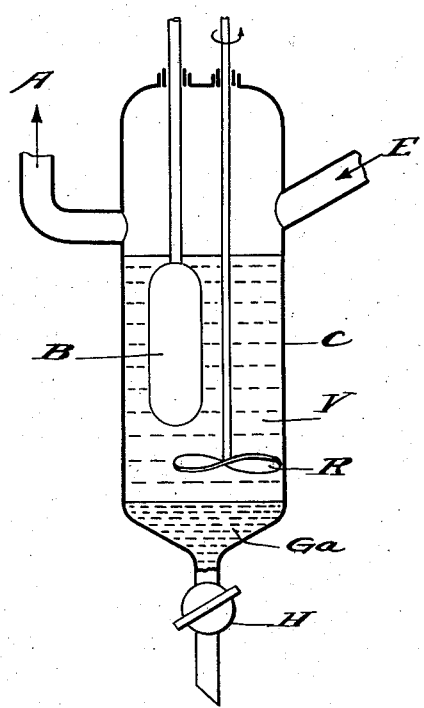

United States Patent Office 2,898,278
Patented Aug. 4, 1959

2,898,278

PROCESS FOR THE PRODUCTION OF HIGH-PURITY GALLIUM

Heinz Gunther Plust, Wettingen, Switzerland, assignor to Aktiengesellschaft Brown, Boveri & Cie., Baden, Switzerland, a joint-stock company Application November 21, 1957, Serial No. 698,007

Claims priority, application Switzerland November 21, 1956

5 Claims. (Cl. 204—157)

The invention relates to a process for the production of gallium of the highest purity, that is to say of the purity required, for example, in the production of semi-conductive combinations, which in turn are used in semi-conductor-rectifiers. The gallium obtained according to the process of the invention is considerably purer than that obtained in known manner, for example, by drawing single crystals or stage-wise drawing, electrolysis, disproportionation of gallium chloride, or shaking out with mercury.

The process according to the invention is characterized in that an organic compound of gallium is prepared from technically pure gallium, and that this compound is then decomposed by ultraviolet radiation. The production of suitable compounds, for example, of the formula:

$$GaH_xR_{(3-x)}$$

(wherein R represents a lower alkyl radical, and $x$ is a whole number less than 3) can be effected according to one of the known methods. Suitable are, for example, gallium tri-ethyl, gallium tri-isopropyl and gallium tri-isobutyl, which are prepared with advantage from the corresponding mercury compounds according to the equation:

$$3\ HgR_2 + 2\ Ga \rightarrow 2\ GaR_3 + 3\ Hg$$

It is advisable to purify the organic compounds of gallium, before its decomposition, by fractional distillation. The compound is then decomposed by ultraviolet radiation in the isolated or dissolved state (suitable solvents being, for example, ethyl ether, tertahydrofurane and dioxane) using the apparatus shown in the accompanying drawing, which apparatus is suitable for the continuous production of high-purity gallium. The organic compound of gallium, V, to be decomposed is fed into the decomposition vessel G together with a protective gas (for example, hydrogen, nitrogen or argon) through the tube E. B is a source for ultraviolet radiation, for example, a mercury vapor lamp. The compound is decomposed under the effect of this radiation, for example, according to the following gross reaction equations, into gallium, saturated and unsaturated hydrocarbons, and hydrogen:

$$2\ Ga(C_2H_5)_3 \rightarrow 2\ Ga + 3\ C_2H_4 + 3\ C_2H_6$$
$$Ga(C_2H_5)_3 \rightarrow Ga + 3\ C_2H_4 + 3/2\ H_2$$

The gallium accumulates at Ga in the lower part of the vessel, and can be removed continuously through the stopcock H. The hydrocarbons and the hydrogen escape with the protective gas through the tube A.

The separation of gallium can be enhanced by stirring with the beater R; also by heating the compound V to an elevated temperature short of that at which substantial thermal decomposition sets in. If the compound V were heated to thermal decomposition it would yield gallium in the form of a gray-black powder which is not very pure and can only be consolidated with difficulty into a homogeneous melt: besides, it is not possible to grow single crystals from this form. Suitable temperatures are 50° C. for gallium triethyl, and 100° C. for gallium tri-isopropyl and gallium tri-isobutyl. Under these conditions, the gallium is precipitated in large drops which consolidate by themselves into a homogeneous melt which can be removed without difficulty from the vessel.

If the organic compound of gallium was prepared from the corresponding mercury compound, the gallium so produced contains—of spectroscopically detectable foreign metals—only mercury, which latter easily can be removed by known methods, for example, by drawing single crystals.

*Specific example*

15 grams of technically pure gallium, analyzing

|    | Percent |
|----|---------|
| Ga | 99.9    |
| Cu | 0.04    |
| and |        |
| Fe | 0.06    | were admixed with 95 grams of mercury di-isopropyl, and the mixture was maintained at a temperature of approximately 120° C. for about 20 hours, the heated mixture being stirred intermittently. Thereafter, the resulting reaction mixture was cooled to 20° C., and its content of gallium tri-isopropyl was separated therefrom by filtration and distillation using nitrogen as protective gas. The gallium tri-isopropyl was purified by fractionally distilling the same under the following conditions: vacuum, 1 mm. Hg; fractionating temperature, 60–100° C.

The so-purified gallium tri-isopropyl was dissolved in ethyl ether to form a 60% solution of the same, and the solution was fed, through tube "E," into the reaction vessel "G" at the rate of 0.01 grams of gallium tri-isopropyl per minute, together with 0.4 cu. ft. per hour of nitrogen as protective gas. The temperature of the contents of the reaction vessel were maintained within the range of 80°–100° C. by a heating band and were subjected to ultraviolet radiation from mercury vapor lamp "B" which, in this experiment was located in middle vessel.

Gallium separated from the reaction mixture in the form of large drops which readily consolidated, in zone "Ga," into a homogeneous melt of gallium. This latter was withdrawn from the vessel, either continuously or intermittently, at the approximate rate of 0.002 grams per minute, through stopcock "H." Simultaneously, the hydrocarbons and hydrogen formed by the decomposition of the gallium tri-isopropyl, together with the ethyl ether (solvent) were continuously removed from the vessel, through tube "A" by the protective gas.

The gallium withdrawn from the decomposition vessel analyzed 99.999% Ga, and was directly usable in the production of gallium alloys.

I claim:

1. Process for the production of gallium of high purity, characterized in that an organic compound of gallium of the formula $GaH_xR_{(3-x)}$ wherein R represents a lower alkyl radical, and $x$ is a whole number less than three) is prepared from technically pure gallium, and that this compound is decomposed by ultraviolet radiation yielding gallium of high purity as a decomposition product.

2. Process according to claim 1, characterized in that the gallium-organic compound is prepared from the corresponding mercury compound and has the formula $GaR_3$, wherein R represents a lower alkyl radical.

3. Process according to claim 1, characterized in that the gallium-organic compound is purified by fractional distillation before its decomposition.

4. Process according to claim 1, characterized in that the organic compound of gallium is fed continuously into a decomposition vessel and that the resulting gallium is continuously removed from this vessel.

5. Process according to claim 1, characterized in that the organic compound of gallium is heated during the decomposition to an elevated temperature below that at which marked thermal decomposition sets in.

References Cited in the file of this patent

FOREIGN PATENTS 17,790     Great Britain _____ Aug. 2, 1913